United States Patent
Chao et al.

(10) Patent No.: US 10,469,569 B2
(45) Date of Patent: Nov. 5, 2019

(54) OPTIMIZING RECEIVE SIDE SCALING KEY SELECTION USING FLOW DATA

(71) Applicant: International Business Machines Corporation, Armonk, NY (US)

(72) Inventors: Chih-Wen Chao, Taipei (TW);
Wei-Hsiang Hsiung, Taipei (TW);
Kuo-Chun Chen, New Taipei (TW);
Ming-Pin Hsueh, New Taipei (TW);
Sheng-Tung Hsu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/928,159

(22) Filed: Mar. 22, 2018

(65) Prior Publication Data
US 2019/0297138 A1 Sep. 26, 2019

(51) Int. Cl.
*H04L 29/08* (2006.01)
*H04L 29/06* (2006.01)

(52) U.S. Cl.
CPC .......... *H04L 67/1002* (2013.01); *H04L 67/42* (2013.01)

(58) Field of Classification Search
CPC ..... H04L 47/10; H04L 67/1002; H04L 67/42; H04W 28/02; H04W 28/0205; H04W 28/021; H04W 28/0247; H04W 28/0252; H04W 28/0257; H04W 28/0263; H04W 28/0268; H04W 28/0273
See application file for complete search history.

(56) References Cited

U.S. PATENT DOCUMENTS

| | | | |
|---|---|---|---|
| 7,765,405 B2 * | 7/2010 | Pinkerton | H04L 9/3236 713/181 |
| 9,755,972 B1 | 9/2017 | Mao et al. | |
| 2007/0230489 A1 * | 10/2007 | Cornett | H04L 47/10 370/412 |
| 2008/0005352 A1 * | 1/2008 | Goglin | H04L 12/56 709/238 |
| 2013/0041934 A1 | 2/2013 | Annamalaisami et al. | |
| 2015/0046618 A1 | 2/2015 | Domsch et al. | |
| 2019/0109858 A1 * | 4/2019 | Chao | H04L 63/12 |

OTHER PUBLICATIONS

Woo et al., "Scalable TCP Session Monitoring with Symmetric Receive-side Scaling", Department of Electrical Engineering, KAIST, accessed Feb. 26, 2018, 7 pages. http://www.ndsl.kaist.edu/~kyoungsoo/papers/TR-symRSS.pdf.

(Continued)

*Primary Examiner* — Sharad Rampuria
(74) *Attorney, Agent, or Firm* — Yee & Associates, P.C.

(57) ABSTRACT

Optimizing receive side scaling (RSS) key selection is provided. Different weights are assigned to different fields of flow data corresponding to a network connection of a registered client device. A score is generated representing an amount of balanced processor loading for each RSS key corresponding to the registered client device based on the different fields of the flow data with assigned weights. A current RSS key on the registered client device is updated with an optimal RSS key based on the score corresponding to the optimal RSS key representing balanced loading of processors on the registered client device.

19 Claims, 6 Drawing Sheets

(56) References Cited

OTHER PUBLICATIONS

Martinez et al., "On Designating Fast Nonuniformly Distributed IP Address Lookup Hashing Algorithms", IEEE/ACM Transactions on Networking, vol. 17, Issue 6, Dec. 2009, pp. 1916-1925.
Chao et al., "Real-Time Adaptive Receive Side Scaling Key Selection", filed Oct. 11, 2017, U.S. Appl. No. 15/729,805, 35 pages.
Chao et al., "Real-Time Adaptive Receive Side Scaling Key Selection", filed Nov. 14, 2017, U.S. Appl. No. 15/811,997, 35 pages.

* cited by examiner

OPTIMIZING RECEIVE SIDE SCALING KEY SELECTION USING FLOW DATA

BACKGROUND

1. Field

The disclosure relates generally to receive side scaling and more specifically to optimizing selection of receive side scaling keys for uniform distribution of network packets across multiple processors or multiple processor cores in a data processing device based on network connection flow data received from the data processing device to increase performance of the data processing device.

2. Description of the Related Art

Receive side scaling (RSS) is a network adapter technology enabling distribution of network receive processing across multiple central processing units in a multiprocessor data processing device, such as a computer. In other words, RSS enables packet receive processing to scale with the number of processors in the multiprocessor data processing device. As a result, RSS helps to make it possible to support higher network traffic loads.

RSS uses a hash function with an RSS hash key to determine the distribution of each incoming network packet. The hash function and resulting hash value provides the means for selecting a processor in the multiprocessor data processing device. The hash function computes a hash value over a defined area within a received network packet. The defined area may be contiguous or noncontiguous. RSS uses a number of least significant bits of the hash value to index an indirection table. RSS uses the values in the indirection table to assign the received network packet to a processor. In other words, the RSS indirection table identifies a particular processor in the multiprocessor device to process the received network packet. In addition, RSS includes a signature that provides added security. This signature protects the multiprocessor device from malicious remote hosts attempting to force the multiprocessor device into an unbalanced state.

SUMMARY

According to one illustrative embodiment, a method for optimizing receive side scaling (RSS) key selection is provided. Different weights are assigned to different fields of flow data corresponding to a network connection of a registered client device. A score is generated representing an amount of balanced processor loading for each RSS key corresponding to the registered client device based on the different fields of the flow data with assigned weights. A current RSS key on the registered client device is updated with an optimal RSS key based on the score corresponding to the optimal RSS key representing balanced loading of processors on the registered client device. According to other illustrative embodiments, a computer system and computer program product for optimizing RSS key selection are provided.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
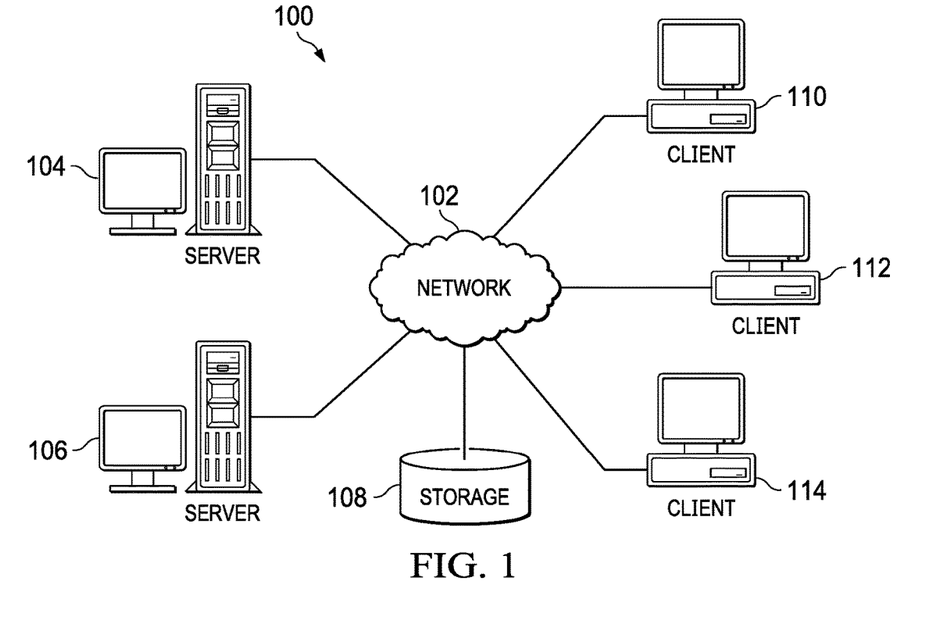
FIG. 1 is a pictorial representation of a network of data processing systems in which illustrative embodiments may be implemented.
Figure 2:
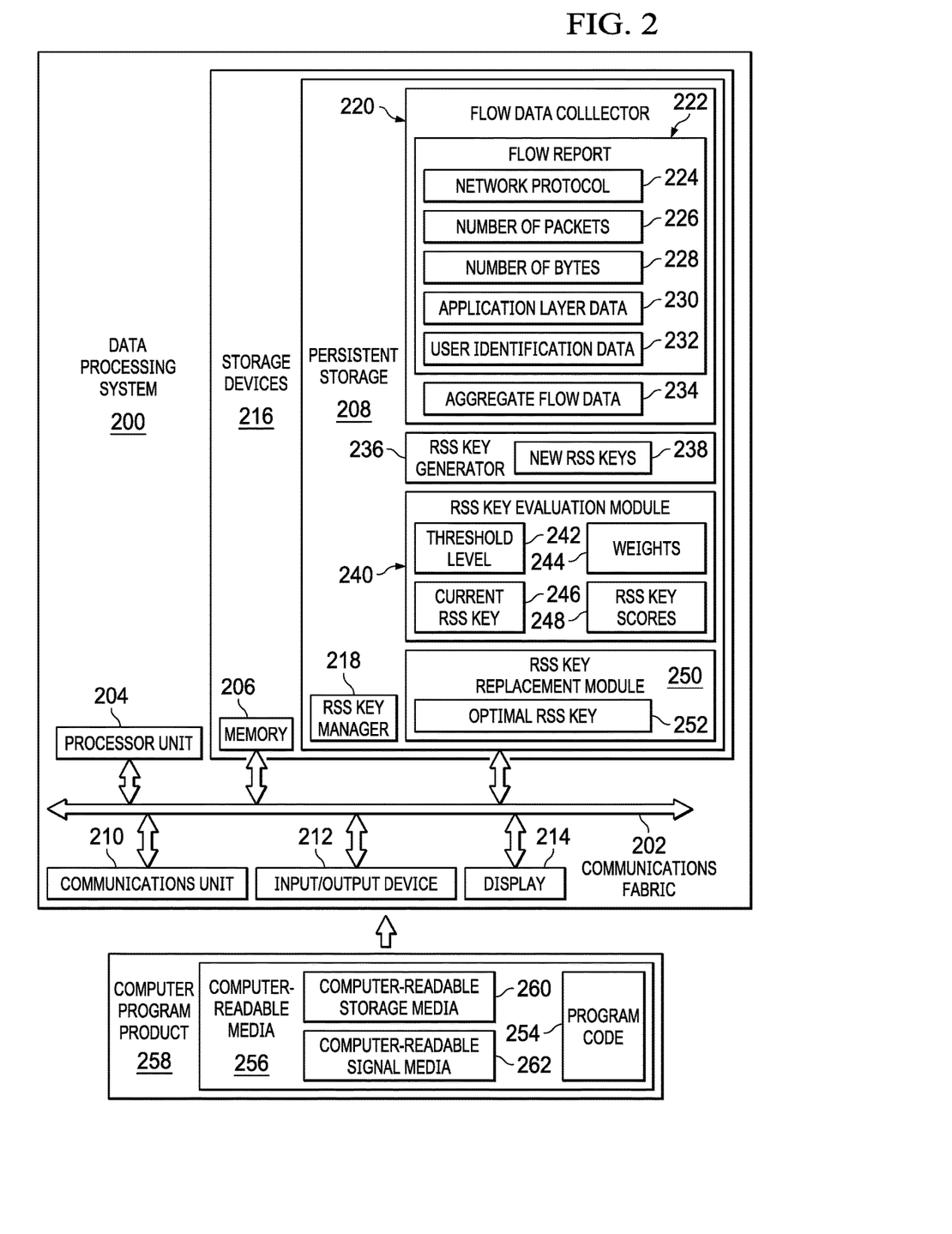
FIG. 2 is a diagram of a data processing system in which illustrative embodiments may be implemented.
Figure 3:
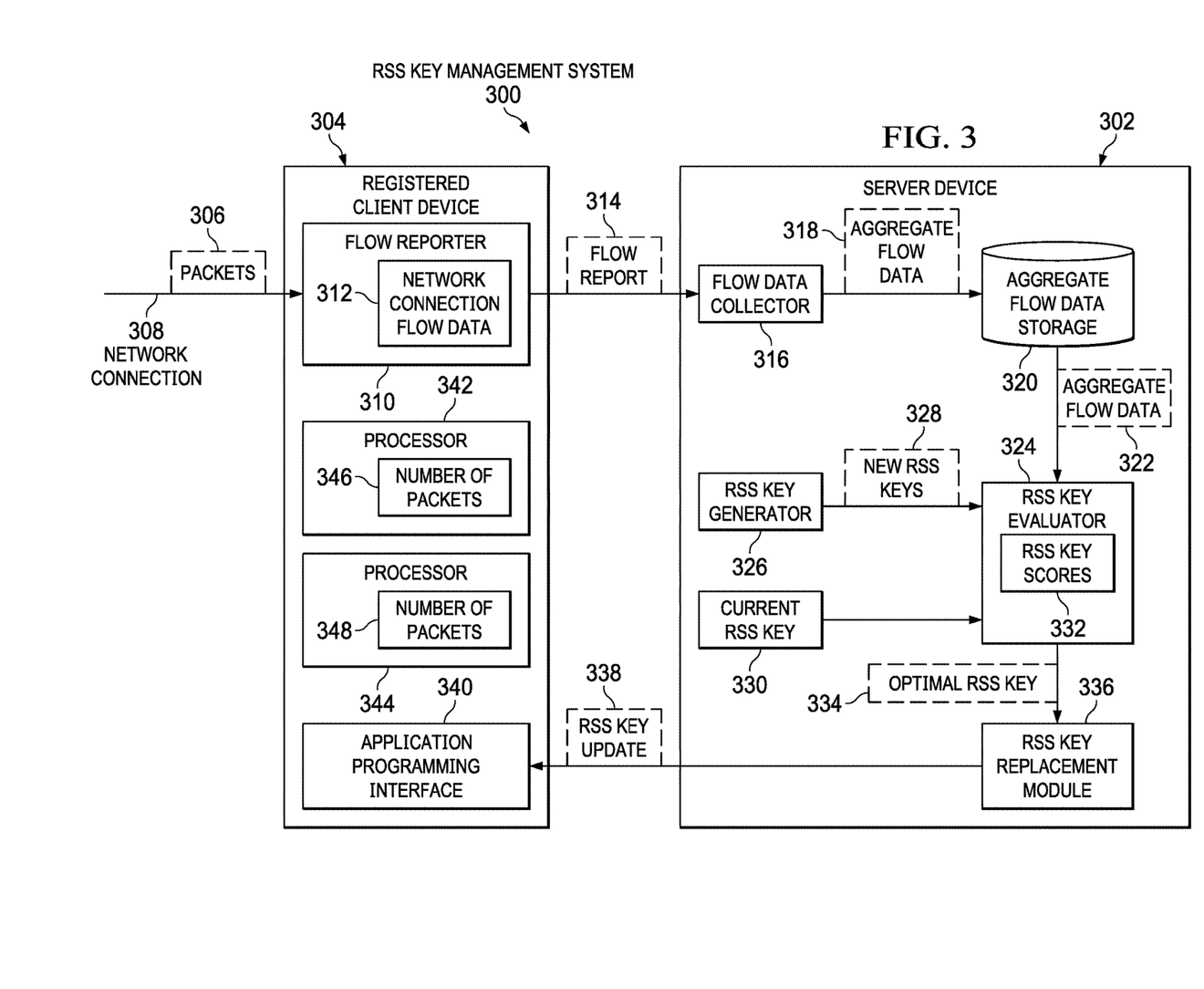
FIG. 3 is a diagram of a receive side scaling (RSS) key management system in which illustrative embodiments may be implemented.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide services for receive side scaling (RSS) key performance evaluation and selection to registered client devices. Also, it should be noted that server 104 and server 106 may each represent a cluster of servers in a data center, for example, providing a plurality of different RSS key evaluation and selection services. Alternatively, server 104 and server 106 may be computer nodes in a cloud environment that provides RSS key evaluation and selection services.

Client 110, client 112, and client 114 also connect to network 102. Clients 110, 112, and 114 are registered clients of server 104 and/or server 106. Clients 110, 112, and 114 send their respective network connection flow data to server 104 and server 106. Server 104 and server 106 utilize the received network connection flow data to evaluate performance of currently active RSS keys and new randomly generated candidate RSS keys corresponding to each of client 110, client 112, and client 114. Further, server 104 and server 106 may send information, such as, applications, programs, or network connection flow reporting agents, to clients 110, 112, and 114.

In this example, clients 110, 112, and 114 are illustrated as desktop or personal computers with wire communication links to network 102. However, it should be noted that clients 110, 112, and 114 are meant as examples only. In other words, clients 110, 112, and 114 may include other types of data processing systems, such as, for example, network computers, laptop computers, handheld computers, and the like, with wire or wireless communication links to network 102.

Storage 108 is a network storage device capable of storing any type of data in a structured format or an unstructured format. In addition, storage 108 may represent a set of one or more network storage devices. Storage 108 may store, for example, identifiers for a plurality of different registered client devices, flow data reports corresponding to each of the plurality of different registered client devices, RSS key packet distribution performance scores, and the like. Further, storage 108 may store other data, such as authentication or credential data that may include user names, passwords, and biometric data associated with system administrators, for example.

In addition, it should be noted that network data processing system 100 may include any number of additional server devices, client devices, and other devices not shown. Program code located in network data processing system 100 may be stored on a computer readable storage medium and downloaded to a computer or data processing system for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. In addition, processor unit 204 may represent a set of two or more hardware processor devices or may represent one processor device with two or more processor cores, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores RSS key manager 218. However, it should be noted that even though RSS key manager 218 is illustrated as residing in persistent storage 208, in an alternative illustrative embodiment RSS key manager 218 may be a separate component of data processing system 200. For example, RSS key manager 218 may be a hardware component coupled to communication fabric 202 or a combination of hardware and software components. In another alternative illustrative embodiment, a first portion of RSS key manager 218 may be located in data processing system 200, while a second portion of RSS key manager 218 may be located in a registered client device, such as client 110 in FIG. 1.

RSS key manager 218 controls the processes of optimizing selection of RSS keys for uniform distribution of network packets across multiple processors or multiple processor cores in corresponding registered client devices based on network connection flow data received from each of the respective registered client devices. In this example, RSS key manager 218 utilizes flow data collector 220 to receive and aggregate network connection flow data from registered client devices. Flow data collector 220 receives network connection flow data from a particular registered client device as flow report 222.

Flow report 222 includes a plurality of fields, each field containing different information corresponding to the network connection of the particular registered client device. In this example, flow report 222 includes network protocol 224, number of packets 226, number of bytes 228, application layer data 230, and user identification data 232. However, it should be noted that alternative illustrative embodiments may include more or less information corresponding to network connection flow of a registered client device in flow report 222 than illustrated. Network protocol 224 represents the network protocol, such as, for example, File Transfer Protocol, Telnet, Trivial File Transfer Protocol, Simple Network Management Protocol, and the like, of the network connection corresponding to the particular registered client device associated with flow report 222. Number of packets 226 represents the number or quantity of packets passing through the network connection to the particular registered client device. Number of bytes 228 represents the number or quantity of bytes contained in number of packets 226. Application layer data 230 represent information, such as data flow latency, error handling and recovery, and the like, corresponding to the network connection of the particular registered client device. User identification data 232 represent information, such as an Internet Protocol address of the particular registered client device, that identifies a particular user. Further, flow data collector aggregates the information in the flow reports received from the particular registered client device over time to form aggregate flow data 234.

RSS key manager 218 utilizes RSS key generator 236 to randomly generate a set of one or more new candidate RSS keys, such as new RSS keys 238, for each registered client device. New RSS keys 238 represent a set of candidate RSS keys that RSS key manager 218 may utilize to replace the currently active RSS key in a particular registered client device when RSS key manager 218 determines that a candidate RSS key in the set has a higher packet distribution score than the currently active RSS key.

RSS key manager 218 utilizes RSS key evaluation module 240 to evaluate actual performance of the currently active RSS key in a particular registered client device and to predicted performance of the set of newly generated candidate RSS keys, such as new RSS keys 238, corresponding to that particular registered client device. RSS key evaluation module 240 evaluates performance on how well the currently active RSS key and each candidate RSS key in the set uniformly distributes or balances the number of network packets across multiple processors or multiple processor cores located in that particular registered client device. However, it should be noted that RSS key evaluation module 240 may not evaluate performance of registered client devices having a corresponding aggregate network connection flow less than threshold level 242. Threshold level 242 represents a threshold amount of network connection flow that must pass through a network connection of a registered client device before RSS key evaluation module 240 will evaluate RSS key performance for that particular registered client device. As a result, RSS key evaluation module 240 may conserve processing resources of data processing system 200 by not evaluating RSS key performance for all registered client devices.

In addition, RSS key evaluation module 240 may apply different weights from weights 244 to the different fields (e.g., network protocol 224, number of packets 226, number of bytes 228, application layer data 230, and user identification data 232) in flow report 222 while evaluating RSS key performance for a particular registered client device. Weights 244 represent a plurality of different factors that RSS key evaluation module 240 may apply to different fields in flow report 222 to weight the information contained in one or more of the different fields. The factor may be positive, which will increase a weight or influence of the information contained in a particular field, or may be negative, which will decrease a weight or influence of a particular field, during RSS key performance evaluation.

Current RSS key 246 represents the currently active RSS key for a particular registered client device that RSS key evaluation module 240 is evaluating. RSS key evaluation module 240 generates RSS key scores 248 for current RSS key 246 and each of new RSS keys 238 based on how well each key distributes network packets across multiple processors or multiple processor cores located in that particular registered client device using the weighted network connection flow data corresponding to that particular registered client device. RSS key evaluation module 240 may perform RSS key evaluation and score generation on a predefined time interval basis, on demand, or on an as needed basis. The predefined time interval may be, for example, every thirty minutes, one hour, two hours, six hours, twelve hours, one day, or any other interval of time.

RSS key manager 218 utilizes RSS key replacement module 250 to identify optimal RSS key 252. Optimal RSS key 252 represents the RSS key having the highest RSS key packet distribution score for uniformly distributing network packets across the multiple processors or multiple processor cores of the registered client device. Optimal RSS key 252 may be current RSS key 246 or one of new RSS keys 238. If optimal RSS key 252 is current RSS key 246, then RSS key replacement module 250 sends an RSS key update to the particular registered client device indicating that current RSS key 246 is the optimal RSS key for distributing network packets. If optimal RSS key 252 is one of new RSS keys 238, then RSS key replacement module 250 updates or replaces current RSS key 246 with the newly generated candidate RSS key having the highest packet distribution score.

Communications unit 210, in this example, provides for communication with other computers, data processing systems, and devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra-high frequency, microwave, wireless fidelity (WiFi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keyboard, keypad, mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 254 is located in a functional form on computer readable media 256 that is selectively removable and may be loaded onto or transferred to data processing system 200 for running by processor unit 204. Program code 254 and computer readable media 256 form computer program product 258. In one example, computer readable media 256 may be computer readable storage media 260 or computer readable signal media 262. Computer readable storage media 260 may include, for example, an optical or magnetic disc that is inserted or placed into a drive or other device that is part of persistent storage 208 for transfer onto a storage device, such as a hard drive, that is part of persistent storage 208. Computer readable storage media 260 also may take the form of a persistent storage, such as a hard drive, a thumb drive, or a flash memory that is connected to data processing system 200. In some instances, computer readable storage media 260 may not be removable from data processing system 200.

Alternatively, program code 254 may be transferred to data processing system 200 using computer readable signal media 262. Computer readable signal media 262 may be, for example, a propagated data signal containing program code 254. For example, computer readable signal media 262 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of nontangible media, such as communication links or wireless transmissions containing the program code.

In some illustrative embodiments, program code 254 may be downloaded over a network to persistent storage 208 from another device or data processing system through computer readable signal media 262 for use within data processing system 200. For instance, program code stored in a computer readable storage media in a data processing system may be downloaded over a network from the data processing system to data processing system 200. The data processing system providing program code 254 may be a server computer, a client computer, or some other device capable of storing and transmitting program code 254.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 260 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Many next-generation devices or appliances are capable of deep packet inspection, which looks in detail at the contents of network traffic. However, certain concerns are introduced with deep packet inspection, along with the complexity of the network traffic. One issue is the latency spike when high CPU-consumed network traffic is assigned to a specific CPU or core. This is due to limited RSS key generation, as current methods simply distribute network packets based on information corresponding to Network Layer 3 and Transport Layer 4 of the OSI model. To compound matters, network packets are being stuck and the process takes a much longer time to complete due to full queue, which highly impacts serviceability.

Illustrative embodiments evaluate RSS key performance to increase device performance. Illustrative embodiments utilize a remote network connection flow data collector to perform the RSS key performance evaluation offline. Then, illustrative embodiments update the currently active RSS key on a registered device with an optimal RSS key having a highest packet distribution score. One advantage of illustrative embodiments over current methods is that illustrative embodiments do not have to calculate each network packet for RSS key performance evaluation. Using an aggregated network connection flow data report, illustrative embodiments only need to calculate each network connection flow once. Moreover, illustrative embodiments also exclude those network connection flows with low network packet counts from evaluation because the impact of these low count network connection flows to overall system performance is minimal and may be ignored saving processing resources.

Illustrative embodiments utilize information fields in network connection flow reports to evaluate performance of currently active and candidate RSS keys and generate scores for each respective RSS key. The different fields of a network connection flow report may include, for example, protocol, packets, bytes/octets, application, and user ID. In addition, illustrative embodiments may assign different weights to different fields for the RSS key performance evaluation so that a generated score can represent balanced CPU or Core loading.

Illustrative embodiments utilize a flow reporter agent located on a registered device to track network connection flow of the registered device and send a report regarding the tracked network connection flow to the remote flow data collector on a periodic basis, for example. The remote flow data collector collects network connection flow reports and aggregates the data. Illustrative embodiments utilize a remote RSS key generator to generate new random RSS key candidates. Illustrative embodiments also utilize a remote RSS key evaluator to evaluate performance of RSS keys using the aggregated network connection flow data. Further, illustrative embodiments may apply different weights to different information contained in the aggregated network connection flow data. Furthermore, illustrative embodiments utilize an application programming interface located in the registered device to remotely update the currently active RSS key with an optimal RSS key for balanced CPU or Core loading.

Thus, illustrative embodiments not only consider network connection flow quantity, but also quality (i.e., the actual loading impact caused by each network connection). As a result, illustrative embodiments provide a practical estimation of performance rather than just a network connection number. In addition, illustrative embodiments also make it possible to predict CPU loading and delay for a registered network device, which is useful for network planning.

With reference now to FIG. 3, a diagram of an RSS key management system is depicted in which illustrative embodiments may be implemented. RSS key management system 300 is a system of software and hardware components for optimizing selection of RSS keys for uniform distribution of network packets across multiple processors or multiple processor cores in a registered client device based on network connection flow data received from the registered client device. RSS key management system 300 may be implemented in a network of data processing systems, such as network data processing system 100 in FIG. 1.

In this example, RSS key management system 300 includes server device 302 and registered client device 304. Registered client device 304 is a registered data processing client of server device 302. Server device 302 may be, for example, server 104 in FIG. 1 or data processing system 200 in FIG. 2. Registered client device 304 may be, for example, client 110 in FIG. 1. However, it should be noted that RSS key management system 300 may include any number of server devices, registered client devices, and other data processing devices not shown.

Registered client device 304 receives incoming packets 306 via network connection 308. Packets 306 may represent any type of network traffic and may contain any type of data. Registered client device 304 includes flow reporter 310. Registered client device 304 utilizes flow reporter 310 to track and record network connection flow data 312, which corresponds to network connection 308. Flow reporter 310 packages network connection flow data 312 in flow report 314. Flow report 314 may be, for example, flow report 222 in FIG. 2 and may contain a plurality of different fields, such as network protocol 224, number of packets 226, number of bytes 228, application layer data 230, and user identification data 232 in FIG. 2.

Registered client device 304 transmits flow report 314 to server device 302 via a network, such as network 102 in FIG. 1. Server device 302 utilizes flow data collector 316 to receive and aggregate the information contained in flow report 314 with other flow reports previously received from registered client device 304 to generate aggregate flow data 318. Aggregate flow data 318 may be, for example, aggregate flow data 234 in FIG. 2. Flow data collector 316 stores aggregate flow data 318 in aggregate flow data storage 320.

Aggregate flow data storage 320 provides aggregate flow data 322, which is substantially the same as aggregate flow data 318, to RSS key Evaluator 324 on a predefined time interval basis or on demand by RSS key Evaluator 324. Server device 302 utilizes RSS key evaluator 324 to evaluate network packet distribution performance of RSS keys corresponding to registered client device 304.

Server device 302 utilizes RSS key generator 326 to generate a set of one or more random candidate RSS keys, such as new RSS keys 328, which correspond to registered client device 304. RSS key generator 326 and new RSS keys 328 may be, for example, RSS key generator 236 and new RSS keys 238 in FIG. 2. Upon receiving aggregate flow data 322 for registered client device 304, RSS key evaluator 324 determines the predicted performance of each RSS key in new RSS keys 328 and the actual performance of current RSS key 330 in uniformly distributing network packets. Current RSS key 330 may be, for example, current RSS key 246 in FIG. 2, and is the currently active RSS key in registered client device 304.

After determining RSS key performance, RSS key evaluator 324 generates RSS key scores 332. RSS key scores 332 may be, for example, RSS key scores 248 in FIG. 2, and represent scores for each of new RSS keys 328 and current RSS key 330. RSS key evaluator 324 selects the RSS key with the highest score as optimal RSS key 334. Optimal RSS key 334 may be, for example, optimal RSS key 252 in FIG. 2, and may be one of new RSS keys 328 or current RSS key 330.

Server device 302 utilizes RSS key replacement module 336, such as RSS key replacement module 250 in FIG. 2, to update the currently active RSS key on registered client device 304 with optimal RSS key 334 by sending RSS key update 338 to registered client device 304.

Registered client device 304 utilizes application programming interface 340 to receive RSS key update 338 from RSS key replacement module 336. Application programming interface 340 implements RSS key update 338 to uniformly distribute packets 306 to processor 342 and processor 344. Number of packets 346 and number of packets 348 represent the actual number of network packets sent to processor 346 and processor 348, respectively, for processing. To be uniform, number of packets 346 and number of packets 348 represent an equal number of packets or a number of packets that are substantially equal. For example, if packets 306 represent twenty network packets, then number of packets 347 would be ten network packets and number of packets 348 would be ten network packets to be uniformly or evenly distributed to processor 342 and processor 344. Similarly, if packets 306 represent twenty-one network packets, then number of packets 346 may be ten network packets and number of packets 348 may be eleven network packets to be substantially uniform.

Also, it should be noted that processor 346 and processor 348 may represent separate processors in registered client device 304 or may represent multiple processor cores in a multicore processor. Further, processors 346 and 348 may represent any number of processors or processor cores.

Figure 4:
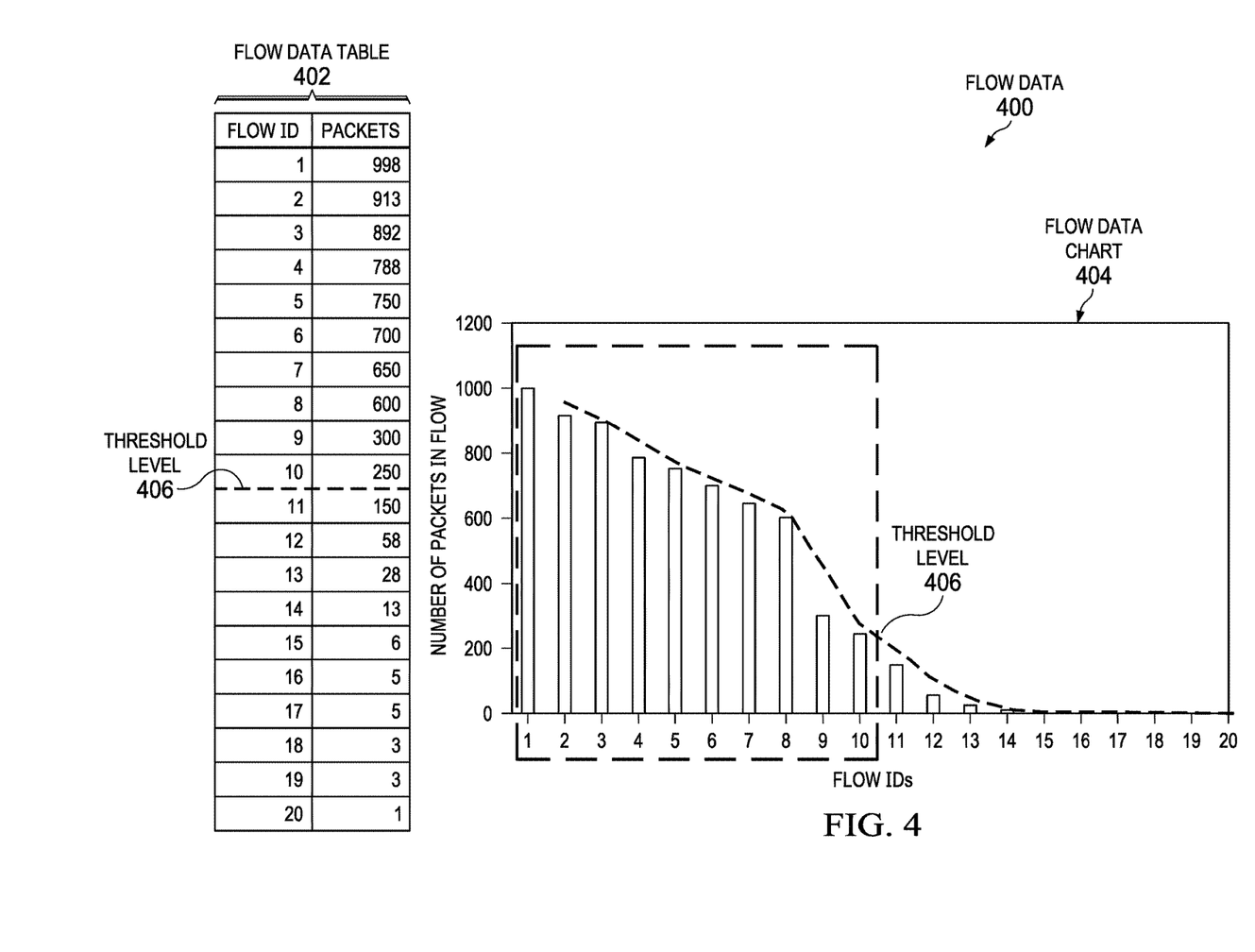
FIG. 4 is a diagram illustrating an example of flow data in accordance with an illustrative embodiment.

With reference now to FIG. 4, a diagram illustrating an example of flow data is depicted in accordance with an illustrative embodiment. Flow data 400 represent network connection flow data, such as number of packets, for a plurality of registered client devices, which correspond to flow identifiers one through twenty in this example. Flow data 400 include flow data table 402 and flow data chart 404. Flow data table 402 and flow data chart 404 include threshold level 406.

Threshold level 406 may be, for example, threshold level 242 in FIG. 2. In this example, threshold level 406 is between 250 and 150 packets. However, it should be noted that threshold level 406 may represent any predefined minimum number of packets for a network connection, such as network connection 308 in FIG. 3. Further, illustrative embodiments may not evaluate RSS key performance for registered devices corresponding to network connections below threshold level 406. As a result, illustrative embodiments may not evaluate RSS key performance for registered devices corresponding to network connection flow IDs 11-20 in this example.

Figure 5:
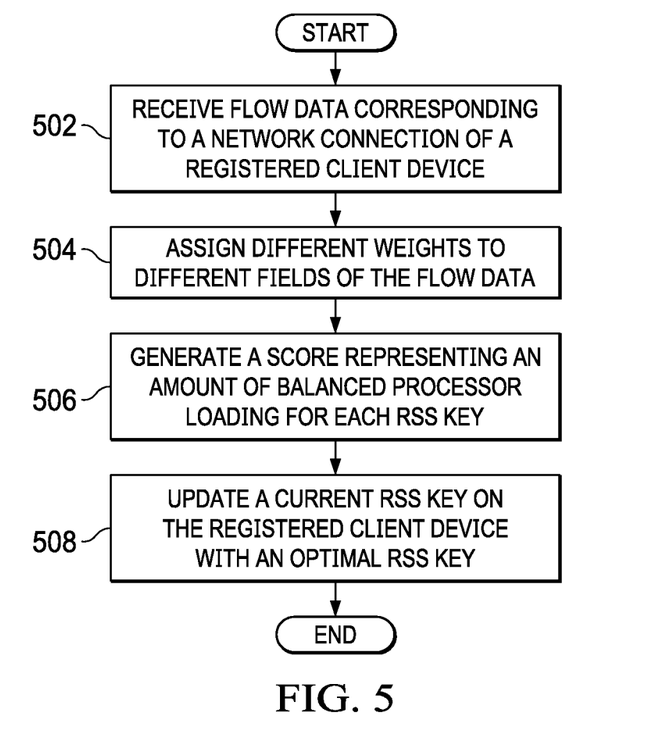
FIG. 5 is a flowchart illustrating a process for optimizing RSS key selection in accordance with an illustrative embodiment.

With reference now to FIG. 5, a flowchart illustrating a process for optimizing RSS key selection is shown in accordance with an illustrative embodiment. The process shown in FIG. 5 may be implemented in a computer, such as, for example, server 104 in FIG. 1 or data processing system 200 in FIG. 2.

The process begins when the computer receives, via a network from a registered client device, flow data corresponding to a network connection of the registered client device (step 502). The computer assigns different weights to different fields of the flow data corresponding to the network connection of the registered client device (step 504). The different fields may include, for example, protocol, packets, bytes, application, user ID, and the like.

The computer generates a score representing an amount of balanced processor loading for each RSS key corresponding to the registered client device based on the different fields of the flow data with assigned weights (step 506). The computer updates a current RSS key on the registered client device with an optimal RSS key based on the score corresponding to the optimal RSS key representing most balanced loading of processors or processor cores on the registered client device (step 508). Thereafter, the process terminates.

Figure 6:
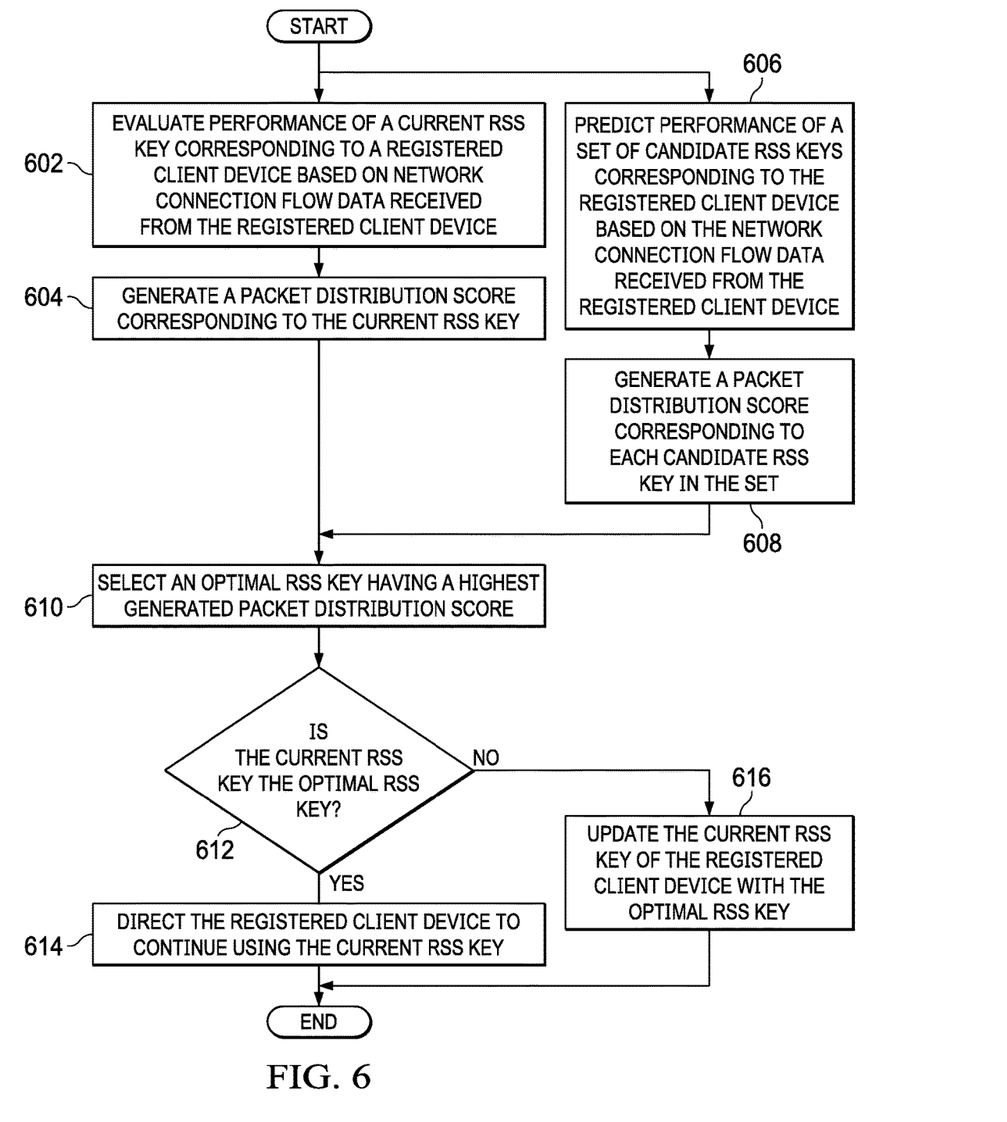
FIG. 6 is a flowchart illustrating a process for evaluating RSS key performance in accordance with an illustrative embodiment.

With reference now to FIG. 6, a flowchart illustrating a process for evaluating RSS key performance is shown in accordance with an illustrative embodiment. The process shown in FIG. 6 may be implemented in a computer, such as, for example, server 104 in FIG. 1 or data processing system 200 in FIG. 2.

The process begins when the computer evaluates performance of a current RSS key corresponding to a registered client device in uniformly distributing network packets across a plurality of processors or processor cores of the registered client device based on network connection flow data received from the registered client device (step 602).

The computer generates a packet distribution score corresponding to the current RSS key based on the performance evaluation (step 604).

Concurrently or at substantially a same time as steps 602 and 604, the computer predicts performance of a set of candidate RSS keys corresponding to the registered client device in uniformly distributing the network packets across the plurality of processors or processor cores of the registered client device based on the network connection flow data received from the registered client device (step 606); and generates a packet distribution score corresponding to each candidate RSS key in the set based on the predicted performance of each key (step 608).

Subsequently, the computer selects an optimal RSS key having a highest generated packet distribution score (step 610). The computer makes a determination as to whether the current RSS key is the optimal RSS key having the highest generated packet distribution score (step 612). If the computer determines that the current RSS key is the optimal RSS key having the highest generated packet distribution score, yes output of step 612, then the computer directs the registered client device to continue using the current RSS key to distribute incoming network packets across the plurality of processors or processor cores located in the registered client device (step 614). Thereafter, the process terminates. If the computer determines that the current RSS key is not the optimal RSS key, no output of step 612, then the computer updates the current RSS key of the registered client device with the optimal RSS key, which is a candidate RSS key having the highest generated packet distribution score (step 616). Thereafter, the process terminates.

Thus, illustrative embodiments of the present invention provide a computer-implemented method, computer system, and computer program product for optimizing selection of RSS keys for uniform distribution of network packets across multiple processors or multiple processor cores in a registered data processing device based on network connection flow data received from the registered data processing device to increase performance of the device. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for optimizing receive side scaling (RSS) key selection, the computer-implemented method comprising:
   assigning different weights to different fields of flow data corresponding to a network connection of a registered client device;
   generating a score representing an amount of balanced processor loading for each RSS key corresponding to the registered client device based on the different fields of the flow data with assigned weights;
   updating a current RSS key on the registered client device with an optimal RSS key based on the score corresponding to the optimal RSS key representing balanced loading of processors on the registered client device;
   determining whether the current RSS key is the optimal RSS key having a highest generated packet distribution score; and
   responsive to determining that the current RSS key is the optimal RSS key having the highest generated packet distribution score, directing the registered client device to continue using the current RSS key to distribute incoming network packets across the processors on the registered client device.

2. The method of claim 1 further comprising:
   receiving from the registered client device, via a network, the flow data corresponding to the network connection of the registered client device.

3. The method of claim 1 further comprising:
   evaluating performance of the current RSS key corresponding to the registered client device in uniformly distributing network packets across the processors on the registered client device based on the flow data received from the registered client device; and
   generating a packet distribution score corresponding to the current RSS key based on the evaluating.

4. The method of claim 1 further comprising:
   predicting performance of candidate RSS keys corresponding to the registered client device in uniformly distributing the network packets across the processors on the registered client device based on the flow data received from the registered client device; and
   generating a packet distribution score corresponding to each candidate RSS key based on the predicting.

5. The method of claim 1 further comprising:
   selecting the optimal RSS key based on the optimal RSS key having a highest generated packet distribution score.

6. The method of claim 1 further comprising:
   responsive to determining that the current RSS key is not the optimal RSS key, updating the current RSS key with the optimal RSS key that is a candidate RSS key having the highest generated packet distribution score.

7. The method of claim 1 further comprising:
   determining whether an amount of flow over the network connection of the registered client device is below a threshold level that represents a threshold amount of network connection flow that must pass through the network connection of the registered client device before performance evaluation of RSS keys corresponding to the registered client device is performed; and
   responsive to determining that the amount of flow over the network connection of the registered client device is below the threshold level, preventing performance evaluation of the RSS keys corresponding to the registered client device to save processing resources.

8. The method of claim 1, wherein the different fields of the flow data include protocol, packets, bytes, application, and user ID.

9. The method of claim 1, wherein the processors are multiple processors in a multicore processor of the registered client device.

10. A computer system for optimizing receive side scaling (RSS) key selection, the computer system comprising:
    a bus system;
    a storage device connected to the bus system, wherein the storage device stores program instructions; and
    a processor connected to the bus system, wherein the processor executes the program instructions to:
    assign different weights to different fields of flow data corresponding to a network connection of a registered client device;
    generate a score representing an amount of balanced processor loading for each RSS key corresponding to the registered client device based on the different fields of the flow data with assigned weights;

update a current RSS key on the registered client device with an optimal RSS key based on the score corresponding to the optimal RSS key representing balanced loading of processors on the registered client device;

determining whether the current RSS key is the optimal RSS key having a highest generated packet distribution score; and responsive to determining that the current RSS key is the optimal RSS key having the highest generated packet distribution score, directing the registered client device to continue using the current RSS key to distribute incoming network packets across the processors on the registered client device.

11. The computer system of claim 10, wherein the processor further executes the program instructions to:

receive from the registered client device, via a network, the flow data corresponding to the network connection of the registered client device.

12. The computer system of claim 10, wherein the processor further executes the program instructions to:

evaluate performance of the current RSS key corresponding to the registered client device in uniformly distributing network packets across the processors on the registered client device based on the flow data received from the registered client device; and generate a packet distribution score corresponding to the current RSS key based on evaluating.

13. The computer system of claim 10, wherein the processor further executes the program instructions to:

predict performance of candidate RSS keys corresponding to the registered client device in uniformly distributing the network packets across the processors on the registered client device based on the flow data received from the registered client device; and generate a packet distribution score corresponding to each candidate RSS key based on predicting.

14. A computer program product for optimizing receive side scaling (RSS) key selection, the computer program product comprising a computer readable storage medium having program instructions embodied therewith, the program instructions executable by a computer to cause the computer to perform a method comprising:

assigning different weights to different fields of flow data corresponding to a network connection of a registered client device;

generating a score representing an amount of balanced processor loading for each RSS key corresponding to the registered client device based on the different fields of the flow data with assigned weights;

updating a current RSS key on the registered client device with an optimal RSS key based on the score corresponding to the optimal RSS key representing balanced loading of processors on the registered client device;

determining whether the current RSS key is the optimal RSS key having a highest generated packet distribution score; and responsive to determining that the current RSS key is the optimal RSS key having the highest generated packet distribution score, directing the registered client device to continue using the current RSS key to distribute incoming network packets across the processors on the registered client device.

15. The computer program product of claim 14 further comprising:

receiving from the registered client device, via a network, the flow data corresponding to the network connection of the registered client device.

16. The computer program product of claim 14 further comprising:

evaluating performance of the current RSS key corresponding to the registered client device in uniformly distributing network packets across the processors on the registered client device based on the flow data received from the registered client device; and generating a packet distribution score corresponding to the current RSS key based on the evaluating.

17. The computer program product of claim 14 further comprising:

predicting performance of candidate RSS keys corresponding to the registered client device in uniformly distributing the network packets across the processors on the registered client device based on the flow data received from the registered client device; and generating a packet distribution score corresponding to each candidate RSS key based on the predicting.

18. The computer program product of claim 14 further comprising:

selecting the optimal RSS key based on the optimal RSS key having a highest generated packet distribution score.

19. The computer program product of claim 14 further comprising:

responsive to determining that the current RSS key is not the optimal RSS key, updating the current RSS key with the optimal RSS key that is a candidate RSS key having the highest generated packet distribution score.

* * * * *